United States Patent [19]

Lorenz

[11] 4,083,152
[45] Apr. 11, 1978

[54] APPARATUS FOR GRINDING OF INTERNAL AXIALLY EXTENDING PROFILES

[75] Inventor: Manfred Lorenz, Coburg-Creidlitz, Germany

[73] Assignee: Kapp & Co. Werkzeugmaschinenfabrik, Coburg, Germany

[21] Appl. No.: 735,978

[22] Filed: Oct. 27, 1976

[30] Foreign Application Priority Data

Nov. 21, 1975 Germany .............................. 2552259

[51] Int. Cl.² ........................ B24B 41/04; B24B 55/02
[52] U.S. Cl. ........................... 51/166 MH; 90/DIG. 8; 51/356; 51/267
[58] Field of Search .................... 51/166 R, 168, 267, 51/356, 169, 92 R, 92 ND, 261, 166 MH, 73 R; 29/DIG. 50, 63, 66, 78, 93; 90/DIG. 8; 144/83

[56] References Cited

U.S. PATENT DOCUMENTS

| | | | |
|---|---|---|---|
| 988,577 | 4/1911 | Knapp | 51/92 R |
| 1,404,538 | 1/1922 | Mitchell | 51/267 |
| 2,904,938 | 9/1959 | Bassoff | 51/267 X |
| 3,247,621 | 4/1966 | Aller | 51/166 R |

Primary Examiner—Harold D. Whitehead
Assistant Examiner—Roscoe V. Parker
Attorney, Agent, or Firm—Martin A. Farber

[57] ABSTRACT

An apparatus for grinding of internal, axially extending profiles, particularly for flanks on spline bore hub profiles and inner toothing, and driven by an electric motor, comprising a grinding arm of mandrel shape having a grinding wheel mounted on both sides therein, a toothed belt completely disposed inside of and running in the grinding arm operatively driving the grinding wheel. Gear wheels and the toothed belt thereabout are disposed in a channel formed in the grinding arm. An encapsulating shield completely encapsulates the grinding arm, the mounting for the grinding wheel, the toothed belt and the gear wheels. The channel constitutes a feed for oiled pressurized air to the mounting for the grinding wheel, and the grinding arm is formed with at least one separate grinding-oil channel adjacent the first mentioned channel for feeding grinding-oil to outside of the encapsulating shield adjacent the grinding wheel.

8 Claims, 3 Drawing Figures

APPARATUS FOR GRINDING OF INTERNAL AXIALLY EXTENDING PROFILES

The invention relates to a device for the grinding of internal axially extending profiles, particularly flanks of spline bore hub profiles or forms, and inner toothings or gear tooth formations, with a grinding wheel, which is mounted on a grinding arm and is driven by an electric motor by means of a belt.

So-called spline bore hub-grinding machines are known by which the workpiece is clamped on a dividing apparatus which is arranged on a machine bed. Furthermore on the machine bed, a table is mounted displaceable in the longitudinal direction of the axis of rotation of the dividing apparatus. This table carries a grinding wheel carriage which moreover is adjustable with respect to the direction of movement of the table in two directions which are perpendicular relative to each other and on which the grinding arm is secured with the grinding wheel. By a movement of the table with the grinding wheel carriage and by the adjustment of the grinding wheel carriage with respect to the table, there can be produced in the workpiece internal axially extending profiles.

With a known device, the grinding wheel is mounted on one side, that is it is disposed in overhung position, and is driven by a cord belt. By the one sided mounting of the grinding wheel there results not only a higher wear inside of the bearing mounting, but rather as a result of the lability of the mounting also inprecisions of the working processing occur, which are still further intensified by the unavoidable slipping of the cord belt.

A liquid turbine driven grinding machine is known from German Pat. No. 419,416 whereby an abrasive grinding wheel is driven via a nozzle directed onto a rotary vane wheel mounted on a fixed shaft, the latter formed with an axial bore for receiving a divided flow of the liquid drive medium for cooling the shaft. The grinding wheel is held by oil rings in ball bearings. Another grinding device is known from U.S. Pat. No. 988,577 wherein a drive shaft via many externally mounted drive belts drives a grinding wheel mounted on an over-hanging cross arm between two final drive pulleys and belts passing there-around all exposed on the end of the arm. Yet in British patent specification No. 575,276 a grinding machine is known having a grinding wheel mounted in side members forming a open ended fork on an exposed spindle and drive pully with ball bearings operatively mounted in the side members. German Gbm No. 1,714,214 disclosed a toothed belt mounted on a toothed belt wheel and on a driven disc per se without any other cooperative structure not requiring lubrication, for tool machines, particularly precision or fine machining apparatus. Still with the above mentioned machines the need existed for an improved device for the grinding of internal axial running profiles.

Accordingly it is an object of the present invention to provide an apparatus for the grinding of internal, axially extending profiles or shapes of the introductory-mentioned type, which avoids the disadvantages of the known devices and provides a secure mounting of the grinding wheel, by which the increased demands or requirements of manufacturing precision, particularly a high shape precision and surface workmanship and finishing quality are achieved in a particularly economical manner.

The solution to this object in accordance with another object of the invention is aided by the invention by mounting the grinding wheel on both sides in a mandrel-shaped grinding arm, and by driving the grinding wheel by a toothed belt which runs completely inside the arm. The mandrel shaped grinding arm is completely surrounded for example by a pushed over tube and a cover sleeve, such that the mounting and drive including the toothed belt and gear wheels are screened hermetically protected against all external influences. The grinding arm is further formed with a recessed channel in which the toothed belt is formed through which oil containing pressurized air is fed to the mounting of the grinding wheel.

With this feature of the invention not only is there provided a secure mounting of the grinding wheel, which fulfils all quality requirements, but also there is obtained a slip-free drive of the grinding wheel as well as a closed construction of the grinding arm, which in cooperation with the mounting or bearing and the drive of the grinding disc, which fulfils on the basis of its increased stability, all claims and demands occurring in practice in an economical working operation. With the device in accordance with the present invention, consequently, not only can the flanks of the spline bore hub profiles be ground with higher precision, but rather as well all axially extending profiles, for example inner toothing for running- and coupling- purposes.

The mandrel formation of the grinding arm and the use of a toothed belt facilitates according to a further cooperative feature of the invention, the feeding of oiled compressed air supplied to the bearings of the grinding wheels through the channel formed in the completely encapsulated grinding arm, which channel is recessed for the toothed belt. In this manner the mounting is oiled, cooled and protected against the penetration of dirt, without the occurrence of an undesired slipping during the drive of the grinding wheel. By means of a control or regulation of the quantity of compressed air, the temperature occurring in the device in accordance with the present invention can be maintained constant.

In order to carry out the most economical grinding process, a separate grinding-oil channel can be formed in the grinding arm, through which grinding-oil is supplied in a predetermined quantity to the grinding wheel. By a preferred embodiment of the invention, the grinding wheel is formed as a metal body provided with a boron nitride covering, which body is secured on a longitudinally bored-through shaft. The high wear resistant grinding covering makes a dressing or adjustment of the grinding wheel in the conventional sense unnecessary.

With the above and other advantages and objects in view, the present invention will become more clearly understood in connection with the following detailed description of a preferred embodiment of the invention with the accompanying drawings, of which:

Figure 1:
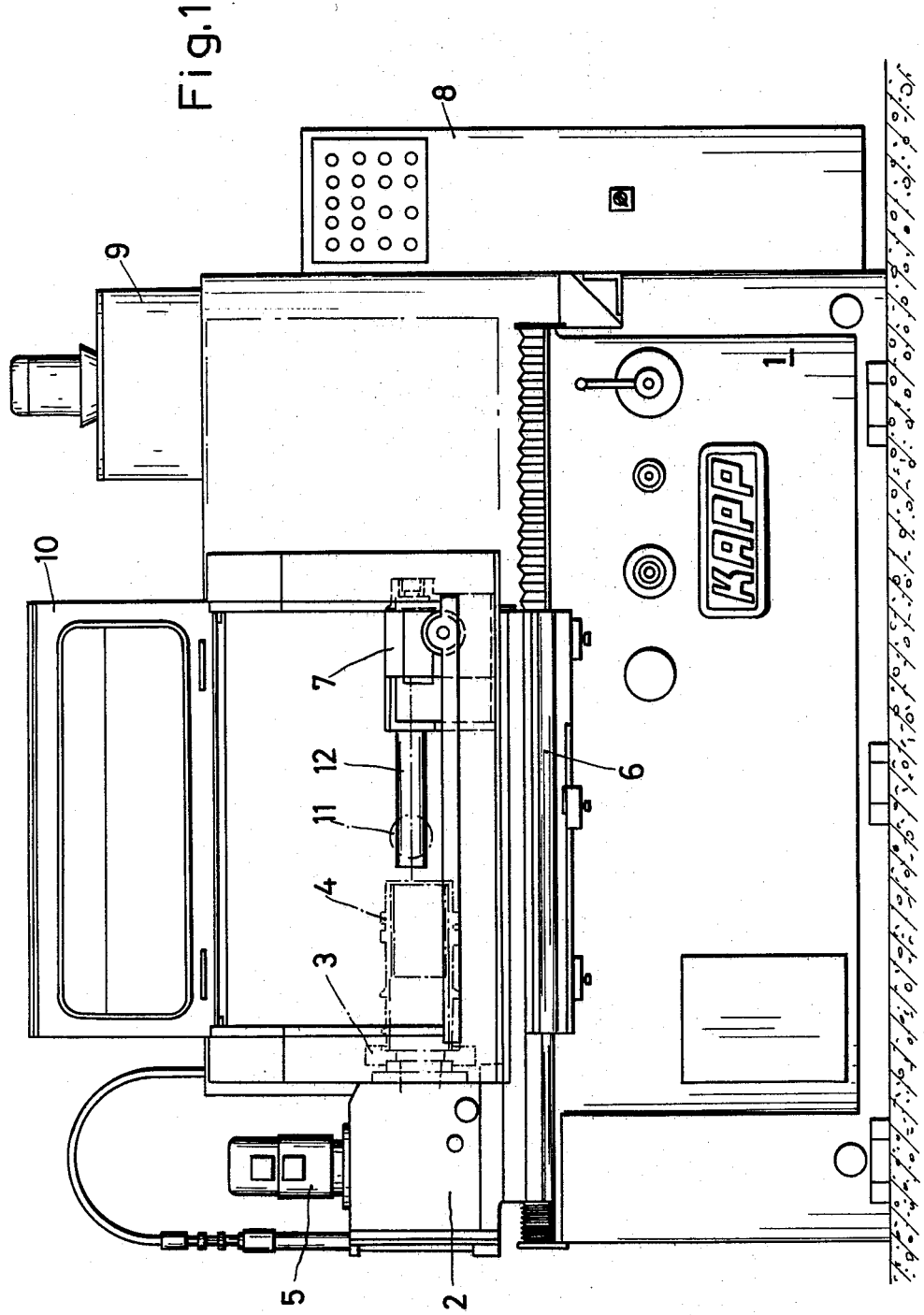
FIG. 1 is a side elevational view of a grinding machine equipped with the apparatus of the present invention.

Referring now to the drawings, and more particularly to FIG. 1, the grinding machine comprises a machine bed 1 on which a table 6 is mounted displaceable in the longitudinal direction with respect to the bed and the table carries a dividing device or indexing attachment. This dividing device or divider 2 includes a workpiece receiver or seat 3, on which the workpiece 4 which is to be worked is secured. By means of a drive motor the dividing device 2 after completion of a working process can further switch or index the clamped workpiece by the desired angle.

Furthermore a grinding wheel carriage 7 is mounted on the machine bed 1, which carriage 7 is adjustable in two directions perpendicular with respect to one another transverse to the direction of movement of the table 6. By the illustrated embodiment example, this makes possible an adjustment of the wheel carriage 7 with respect to the table 6, on the one hand in the horizontal direction and the other hand in the vertical or perpendicular direction. The horizontal adjustment serves for the setting or regulation of the grinding wheel on the flank or edge to be ground, and the vertical adjustment serves for the adjustment and control on the profile section diameter.

Furthermore as seen in the drawings, a control- and switching cabinet 8 is provided, as well as an oil spray or atomizer suction removal device 9 and cover hood 10 by which the working area of the grinding machine can be closed. The cover head 10 shown in FIG. 1 is illustrated in the upper or flapped open tilted position.

Figure 2:
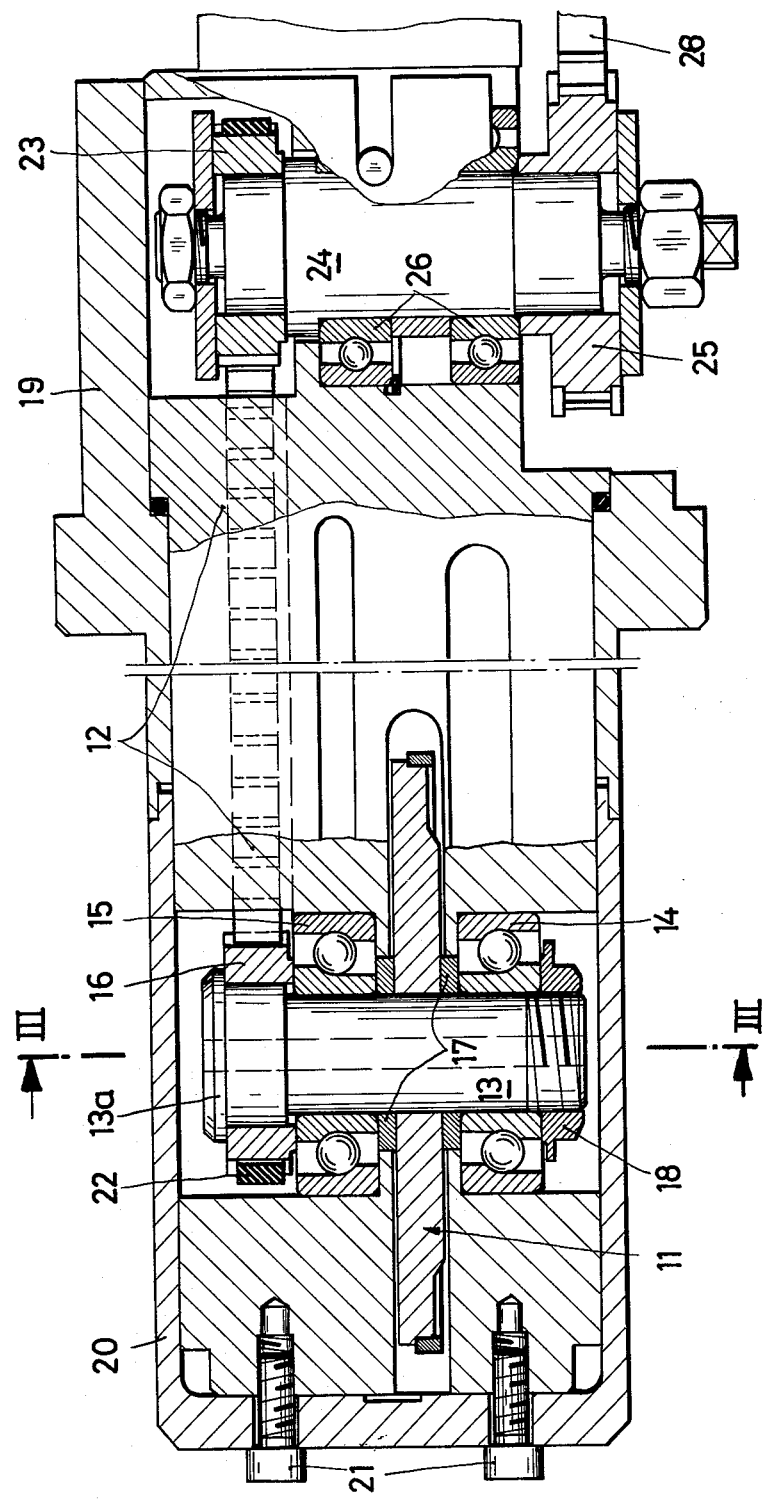
FIG. 2 is a horizontal longitudinal section through the grinding arm of the apparatus illustrated in FIG. 1.
Figure 3:
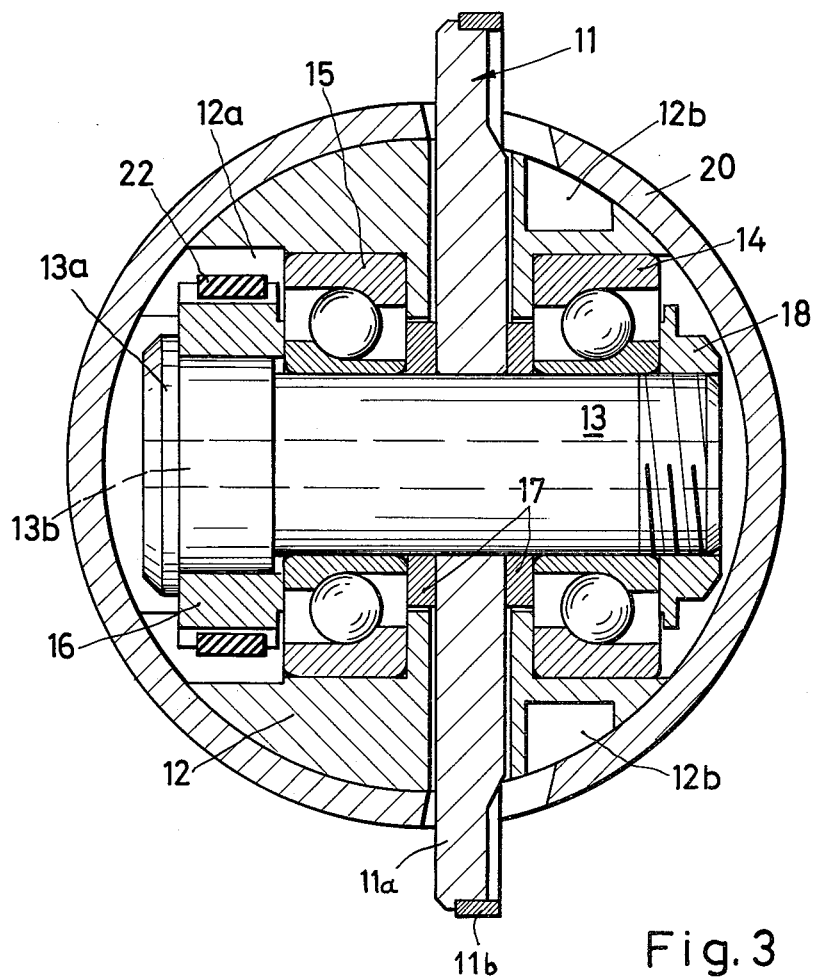
FIG. 3 is a cross-section taken along the lines III—III in FIG. 2.

Referring now again to the drawings and more particularly to FIGS. 2 and 3 showing in enlarged size the device for the mounting and for the drive of a grinding wheel 11, comprising a mandrel-shaped grinding arm 12, which is secured exchangeably or replaceably on the grinding wheel carriage 7. In a recess of the grinding arm 12, the grinding wheel 11 is secured to shaft 13, the latter being rotatably mounted by means of two roller bearings 14 and 15, which are arranged on both sides of the grinding wheel 11. By the illustrated embodiment example the roller bearings 14 and 15 are constructed as deep groove ball bearings. The shaft 13 is provided with a head collar 13a on which a tooth gear wheel 16 engages for operatively turning the shaft 13 by means of a toothed belt 22 looped therearound. The gear wheel 16, the two roller bearings 14 and 15, and the grinding wheel 11 which is fixed by two shim rings or adjusting washers 17, are cooperatively held assembled by a nut 18, which is screwed on a thread of the shaft 13, which thread is formed on that end of the shaft which is opposite to the head collar 13a.

The grinding arm 12 is completely encapsulated by a cover tube 19 as well as by a cover sleeve 20 arranged in tandem with respect to each other as seen in FIG. 2 and complementarily stepped at their respective engaging ends. The cover sleeve 20 is formed with one closed end side wall and secured on this front surface or face side wall by means of screws 21 to the grinding arm 12. The cover sleeve 20 is formed with a slit for the edge of the grinding wheel 11 to extend therethrough. The grinding wheel 11 is made of a metallic body 11a, which is provided with an annular shaped grinding covering 11b made of boron nitride. The opposite lateral surfaces of the grinding wheel are spaced from adjacent internal surfaces of the grinding arm 12 defining gaps therebetween communicating with one side of the roller bearings 14 and 15 and the channel 12a.

The drive of the grinding wheel 11 takes place by means of the toothed belt 22 which runs inside of the grinding arm 12 in a channel 12a provided for this purpose in the grinding arm 12. With the illustrated embodiment example, the toothed belt 22 in the rear end of the grinding arm 12 is looped around a drive gear wheel 23. The latter is seated together with an outer gear wheel 25 on a drive shaft 24, which shaft 24 is rotatably mounted in the rear of the grinding arm 12 by means of a ball bearing set 26. The, for example, outer gear wheel 25 which is further driven by a toothed belt 28 is disposed outside of of the grinding arm 12. In this manner, in a simple way the drive is obtained for the completely encapsulated toothed belt 22.

By means of the channel 12a for the toothed belt 22, an oil containing-pressurized or compressed air is fed to the roller bearings 14 and 15 from a pressurized supply (not shown). Since the toothed belt 22 is cooperatively operated, positively without slipping or friction, with the gear wheel 16 as well as also with the drive gear 23, the oil contained in the compressed air can cause no slipping. While the oil-containing compressed air arrives from the channel 12a directly into the roller bearing 15, a feeding or supply to the roller bearing 14 which is disposed on the other side of the grinding disc 11 results by means of a central bore 13b formed in the shaft 13, which may clearly be seen in FIG. 3. The oil-containing compressed air consequently is not only provided in a position to lubricate both roller bearings 14 and 15, and to keep free of impurities, but it also permits the entire grinding arm 12 to be cooled to the lowest possible constant temperature. Finally the compressed air prevents the penetration of grinding dust and grinding oil through the slit into the cover sleeve 20.

By the complete encapsulation of the grinding arm 12 and by the use of oil containing compressed air, it is possible to carry out the grinding operation under the supply of grinding oil. For this purpose in the grinding arm there is formed at least one separate grinding oil channel 12b. With the illustrated embodiment form, as may be particularly recognized in FIG. 3, there exists two grinding-oil channels 12b. These grinding-oil channels 12b open directly to the slit for the grinding disc 11, which slit is formed in the cover sleeve 20, so that the grinding-oil is directly fed into the operating region.

While I have disclosed an embodiment of the invention, it is to be understood that this embodiment is given by example only and not in a limiting sense.

I claim:

1. An apparatus for grinding of internal, axially extending profiles, particularly for flanks on spline bore hub profiles and inner toothing, and driven by an electric motor, comprising a grinding arm having a mandrel shape, a grinding wheel mounted on both sides in said grinding arm, a belt longitudinally extending completely within said grinding arm and operatively connected to the electric motor and operatively connected to said grinding wheel, said belt being formed as a toothed belt and disposed completely inside of said grinding arm, mounting means for operatively mounting said grinding wheel in said grinding arm, gear wheels disposed in said grinding arm with said toothed belt mounted thereabout, operatively connected to said grinding wheel, encapsulating means for completely encapsulating said grinding arm, said mounting means, said toothed belt and said gear wheels, said grinding arm being formed with a recess longitudinally therethrough forming an open-circuit first channel means for communicating with said mounting means on one side of the latter and with the ambient on the other side outside of said mounting means, said toothed belt being longitudinally positioned entirely in said grinding arm in said first channel means, said first channel means including means for feeding compressed air containing spray oil therethrough to said mounting means and passing from said mounting means freely into the ambient outside of said encapsulating means for cooling the grinding arm and lubricating said mounting means during passage therethrough, and said grinding arm is formed with at least one separate channel means non-communicatingly separate from and adjacent to said first channel means for feeding grinding liquid to outside of said encapsulated means adjacent to said grinding wheel, whereby the pressure of the compressed air prevents grinding liquid and dust from entering the first channel means and the mounting means.

2. The apparatus, as set forth in claim 1, wherein said encapsulating means includes, a cover tube pushed over said grinding arm, and a cover sleeve disposed in tandem relative to said cover tube on said grinding arm, said cover tube and said cover sleeve cooperatively completely encapsulate said grinding arm, said cover sleeve is formed with a slit through which said grinding wheel peripherally extends.

3. The apparatus, as set forth in claim 2, wherein said at least one separate channel means communicates with said slit in said cover sleeve.

4. The apparatus, as set forth in claim 3, wherein said mounting means includes, a shaft rotatably mounted in said grinding arm, said grinding wheel is fastened to said shaft, said shaft is formed with a longitudinal bore therethrough and having end communicating with said first channel means, said grinding wheel constitutes a metallic body, and an annular covering made of boron nitride and disposed on the periphery of said grinding wheel.

5. The apparatus, as set forth in claim 4, wherein said grinding arm forms another recess communicating with one of said ends of said shaft, the other end of said shaft directly being disposed in said first-mentioned recess in said first channel means, said mounting means further includes deep groove roller ball bearings disposed on opposite sides of said grinding wheel in said grinding arm and operatively rotatably mounting said shaft therein, one of said deep groove roller ball bearings being disposed in said first-mentioned recess in said first channel means, and another of said deep groove roller ball bearings on the other side of said grinding wheel is disposed in said another recess thereby in communication with said first channel means via said longitudinal bore in said shaft, said another recess constitutes an extension of and part of said first channel means.

6. The apparatus, as set forth in claim 4, wherein said cover sleeve is formed with one closed end side wall, screws passing through said wall releaseably fasten said cover sleeve to said grinding arm, the other end side of said cover sleeve is formed open and with stepped edges, and said cover tube is formed with an open end with edges cooperatively complementarily engaging with said stepped edges of said cover sleeve.

7. The apparatus, as set forth in claim 5, wherein said shaft is formed with a head collar on one end engaging one of said gear wheels in said first channel means, the other end of said shaft is formed with a screw thread, and a nut secured on said screw thread cooperatively holding said mounting means in position.

8. The apparatus as set forth in claim 5, wherein said grinding arm includes first surfaces spaced from and adjacent said grinding wheel, said encapsulating means includes a cover sleeve formed with a slit through which said grinding wheel peripherally extends, said grinding wheel has opposite lateral surfaces spaced from said first surfaces, respectively, of said grinding arm defining gaps communicating with said slit and with said roller ball bearings, said gaps constitute portions of said first channel means, said at least one separate channel means constitutes two separate channel means communicating with said slit in said cover sleeve at substantially diametrically opposite positions thereof, respectively, said first channel means communicates with said slit via said gaps, whereby the compressed air therein prevents the grinding liquid from entering said gaps and prevents the two separate channel means from effectively communicating with said gaps.

* * * * *